United States Patent Office 3,453,228
Patented July 1, 1969

3,453,228
HEAT-CURABLE, HEAT STABLE ORGANOSILICON ELASTOMERIC COMPOSITIONS OF HIGH STRENGTH AND LOW ELONGATION
Virgil L. Metevia and Keith E. Polmanteer, Midland, Mich., assignors to Dow Corning Corporation, Midland, Mich., a corporation of Michigan
No Drawing. Filed Mar. 16, 1964, Ser. No. 352,307
Int. Cl. C08g *31/09, 47/08, 51/10*
U.S. Cl. 260—37                  14 Claims

ABSTRACT OF THE DISCLOSURE

Heat-curable siloxane elastomer consisting essentially of polyorganosiloxane and fibrous chrysotile asbestos with an inactivating compound and curing catalyst; said elastomer jointly exhibiting superior flexibility, resiliency, low elongation, heat stability and toughness. An illustrative example of the elastomeric formulation would be (a) dimethylsiloxane with some methylvinylsiloxane, fibrous chrysotile asbestos and (b) ethylpolysilicate, and (c) curing catalyst, tertiary butyl perbenzoate.

---

This application relates to heat-stable organosilicon elastomers of greater toughness and lower elongation than previously known organosilicon elastomers.

It has been known that there is great potential advantage in formulating siloxane elastomers with an inorganic, flexible, fibrous material as the filler, e.g. chrysotile asbestos. Such a composition would combine the advantages of a filled, organosilicon elastomer with an organosilicon laminate; i.e., flexibility and resiliency would be combined with tear resistance, strength, and abrasion resistance, and all this would be coupled with great potential heat-stability. This occurs because the fibrous asbestos can form a mat-like configuration in the silicone elastomer, adding strength and toughness to the entire composition.

The great problem has been that previously-known silicone elastomer-chrysotile formulations have been found to be heat-degradable to a degree that greatly exceeds other filled silicone elastomers. Heat stability is, of course, the most important single selling point of silicone elastomers, so chrysotile asbestos-filled silicone elastomers have not been of commercial importance despite their other desirable characteristics.

It is believed that silicone-chrysotile elastomers are heat-degradable because of the particular chemical structure of chrysotile asbestos. In chrysotile asbestos the magnesium oxide and magnesium hydroxide component of the magnesium silicate is found on the surface, rather than the $SiO_2$ component. Those magnesium-hydroxyl bonds are, of course, alkaline, and it is well known that alkali is a depolymerization catalyst for siloxane polymers.

Therefore, it most surprisingly turns out that mixtures of two materials which gain their fame from their properties of heat stability are not stable at high temperatures. No other form of asbestos has fibers that match the flexibility of chrysotile fibers; therefore, no other form of asbestos will give the excellent strength results that chrysotile gives as a filler for siloxane elastomers.

It is an object of this invention to create heat-stable siloxane elastomers that contain fibrous chrysotile fillers.

It is an advantage of this invention that such siloxane elastomers can possess flexibility, resiliency, low elongation, heat stability, and toughness; a combination which has hitherto been quite rare in siloxanes.

This invention relates to a composition consisting essentially of (a) a mixture of 100 parts by weight of a polyorganosiloxane in which the organic substituents are essentially all methyl, phenyl, trifluoropropyl, hydrogen, hydroxyl or vinyl radicals, no more than 0.5 mol percent of said substituents being hydrogen, hydroxyl and vinyl, said siloxane having a degree of polymerization of at least 100; plus from 2 to 35 parts by weight of fibrous chrysotile asbestos, (b) a stabilizing amount of a compound consisting of $R'_m Si(OR)_x$ or partial hydrolyzates thereof, where $R'$ is a hydrocarbon radical of no more than twelve carbon atoms, $m$ is an integer of 0 or 1, $R$ is an alkyl radical of less than seven carbon atoms or an alkoxyalkyl radical of less than seven carbon atoms, and $x$ is an integer of 3 or 4 and (c) a catalytic amount of a curing catalyst.

Ingredient (a) can contain more than one type of organopolysiloxane. Siloxane crosslinking agents, for example, can be added to the siloxane polymer, and mixtures of polymers can also be used.

By "consisting essentially of" it is implied that other ingredients which do not interfere with the operation of this invention can be added. Examples of those would include other fillers besides the fibrous chrysotile, such as silica, titania, or ferric oxide, and crosslinking agents which are not siloxanes.

The composition of this invention is made by the process of this invention, which comprises combining, before the composition is completely mixed, the ingredients of the composition of this invention as shown above.

The above-mentioned mixing process is, of course, the essential mixing process that all elastomeric compositions must undergo before vulcanization to intimately disperse their various ingredients. This is best accomplished by mixing with a shearing action, such as is obtained on a rubber mill or in a Banbury mixer. It is important that ingredient (b) be present in at least the final stages of mixing (1) in order to disperse the ingredient throughout the mixture and, it is believed, (2) to be present to treat the entire surface of the chrysotile filler, which undergoes some separation of the fiber bundles during the mixing, thereby exposing fresh, untreated fiber surface. It is believed that ingredient (b) adheres to the surface of the fibrous alkaline catalyst, thereby inactivating the Mg—OH bonds.

The chrysotile fibers are best dispersed in the elastomer stock by milling the mixture with solvent (e.g. toluene) on a three-roll mill, then removing the solvent by means of a hot two-roll mill.

It is preferred not to pretreat the crysotile filler with ingredient (b) as a substitute for adding free ingredient (b) to the mixture. Such a process will not take care of the new, fresh surface exposed by fiber separation of the fiber bundles. At least some of ingredient (b) should be added in a free form to the rubber stock before or during mixing.

R can be any alkyl radical of less than seven carbon atoms such as methyl, ethyl, isopropyl, isobutyl, or hexyl.

R can also be any alkoxyalkyl radical of less than seven carbon atoms such as —$C_2H_4OCH_3$, —$CH_2OC_2H_5$, —$C_2H_4OC_4H_9$, —$CH_2OCH_3$, —$C_2H_4OC_2H_5$, etc.

R' can be any hydrocarbon radical of no more than 12 carbon atoms, e.g. alkyl radicals such as methyl, ethyl, isohexyl and dodecyl; alkenyl radicals such as vinyl, allyl, butadienyl, and 3-octenyl; cycloalkyl and alkenyl radicals such as cyclohexyl and cyclohexenyl; and aryl radicals such as phenyl, tolyl, xenyl and benzyl.

The chrysotile filler must be fibrous in order to give the added increase in strength to the siloxane polymer which is one advantage of this invention. During milling, the fibers tangle and form a loose fabric-like material in which the siloxane polymer is imbedded. This quasi-fabric has been found, by dissolving the siloxane polymer from within it, to have physical strength in its own right.

Ingredient (b), the stabilizing compound, can be mixed with the elastomer and filler in proportions of 1 to 100 weight percent, based on the weight of the chrysotile asbestos. If desired, even more of ingredient (b) can be added than 100 weight percent, but it serves no function, in terms of the purposes of this invention. The preferred range for ingredient (b) is from 5 to 75 weight percent, based on the weight of the chrysotile.

The preferred ingredient (b) is ethylpolysilicate, which is a partial hydrolyzate of $Si(OC_2H_5)_4$.

Ingredient (c) can be any appropriate curing catalyst for the siloxane polymer used.

For example, if the siloxane polymer contains both vinyl groups and Si-H bonds, chloroplatinic acid would be a suitable catalyst. The proportions and methods of this catalytic reaction are well known to the art, see U.S. Patent 2,823,218.

Other suitable curing catalysts are sulfur (when the siloxane contains vinyl groups) and peroxides such as tertiary butyl perbenzoate, dicumyl peroxide, benzoyl peroxide, and other peroxide curing agents. If a hydrophobic filler is present in the elastomeric composition, and if the elastomer contains silicon-bonded hydroxyl groups, cyanoguanidine can be used as the curing catalyst (see U.S. Patent 3,086,954).

The following examples are illustrative only and should not be construed as limiting the invention which is properly delineated in the appended claims.

Example 1

Six samples, each containing 100 parts by weight of a dimethylsiloxane polymer of about 5,000 siloxane units containing 7.5 mol percent phenylmethylsiloxane units and 0.142 mol percent methylvinylsiloxane units, a catalytic amount of tertiary butyl perbenzoate, and 15 parts of chrysotile asbestos with an average fiber length of 0.282 in., were prepared. To samples 2, 4 and 6 were added 5 parts of ethylpolysilicate.

The six samples were milled and cured at 150° C. for 10 minutes. Samples 3 and 4 received additional heating of 150° C. for 24 hours. Samples 5 and 6 received additional heating of 250° C. for 24 hours.

The durometer, tensile strength and weight loss (due to depolymerization of the elastomer into volatile cyclic siloxanes) was measured for each sample.

| Sample | Shore "A" Durometer | Tensile P.s.i. | Percent elongation | Percent weight loss based on polymer |
|---|---|---|---|---|
| 1 | 69 | 350 | 20 | |
| 2 | 82 | 560 | 20 | |
| 3 | 77 | 370 | 30 | 3.95 |
| 4 | 83 | 615 | 18 | 2.51 |
| 5 | Unmeasurable | | | 96.75 |
| 6 | 77 | 670 | 15 | 4.53 |

Example 2

Six samples were made, each containing 100 parts by weight of a dimethylsiloxane polymer of about 5,000 siloxane units containing 7.5 mol percent of phenylmethyl- siloxane units and 0.142 methylvinylsiloxane units, 2.5 parts of dichlorobenzoyl peroxide dissolved in 1½ times its weight of dimethylpolysiloxane, 3 parts of high surface area silica, and 30 parts of chrysotile asbestos with an average fiber length of 0.124 in.

To samples 2, 4 and 6 were added 3 parts of ethylpolysilicate.

The samples were milled, and vulcanized for five minutes at 125° C. Samples 3 and 4 were heated for 24 hours at 150° C. Samples 5 and 6 were heated for 24 hours at 250° C.

The results follow:

| Sample | Shore "A" Durometer | Tensile P.s.i. | Percent elongation | Percent weight loss based on polymer |
|---|---|---|---|---|
| 1 | 81 | 540 | 30 | |
| 2 | 78 | 1,060 | 20 | |
| 3 | 67 | 670 | 20 | 36.8 |
| 4 | 80 | 1,425 | 20 | 6.0 |
| 5 | 42 | 120 | 10 | 61.8 |
| 6 | 78 | 1,110 | 20 | 10.7 |

Example 3

When 97 parts of

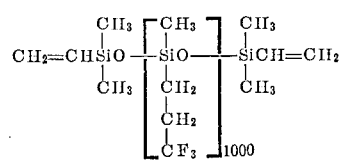

3 parts of

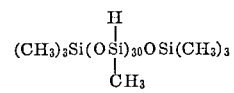

0.01 part of chloroplatinic acid, 2 parts of fibrous chrysotile asbestos, and 2 parts of methyl orthosilicate are milled, a heat-stable material which is heat-curable to an elastomer is formed.

Example 4

When 100 parts by weight of

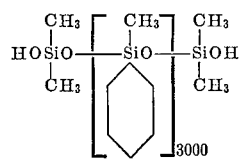

10 parts of fibrous crysotile, 25 parts of trimethlysiloxy-treated silica filler having a surface area of 150 sq. m. per gram, ½ part of phenyltriisohexoxy silane, and 1 part of cyanoguanidine are milled, a heat-stable material which is heat-curable to an elastomer is formed.

Example 5

When 100 parts by weight of a dimethylpolysiloxane polymer containing 0.5 mol percent of methylvinylsiloxane units and having about 5,000 siloxane units per molecule, 2 parts of sulfur, 1 part of tetramethylthiuram disulfide, 35 parts of fibrous crysotile asbestos which has been surface-treated with trimethylmethoxysilane, and 20 parts of the partial hydrolyzate of 3-vinyldecyl tri-beta-ethoxyethoxysilane are milled, a heat-stabyl material which is heat-curable to an elastomer is formed.

That which is claimed is:
1. The process of making a heat-curable, heat-stable organosilicon elastomer comprising combining, before the composition is completely mixed, (a) a mixture of 100 parts by weight of a polyorganosiloxane in which the organic substituents are essentially all selected from the group consisting of methyl, phenyl, trifluoropropyl, hydrogen, hydroxyl, and vinyl radicals, no more than 0.5 mol percent of said substituents being hydrogen, hydroxyl and vinyl, said siloxane having a degree of polymerization of at least 100, plus from 2 to 35 parts by weight of fibrous chrysoltile asbestos as a filler, (b) a stabilizing amount of a compound selected from the group consisting of $R'_m Si(OR)_x$ and partial hydrolyzates thereof, where $R'$ is a hydrocarbon radical of no more than twelve carbon atoms, $m$ is an integer of 0 through 1, R is selected from the group consisting of alkyl radicals of less than seven carbon atoms and alkoxyalkyl radicals of less than seven carbon atoms, and $x$ is an integer of 3 through 4; and (c) a catalytic amount of a curing catalyst.

2. The process of making a heat-curable, heat-stable organosilicon elastomer comprising combining, before the composition is completely mixed, (a) a mixture of 100 parts by weight of a polyorganosiloxane in which the organic substituents are essentially all selected from the group consisting of methyl, phenyl, trifluoropropyl, hydrogen, hydroxyl, and vinyl radicals, no more than 0.5 mol percent of said substituents being hydrogen, hydroxyl and vinyl, said siloxane having a degree of polymerization of at least 100, plus from 2 to 35 parts by weight of fibrous chrysotile asbestos as a filler, (b) from 5 to 75 percent by weight, based on the weight of said chrysotile filler, of a compound selected from the group consisting of $R'_m Si(OR)_x$ and partial hydrolyzates thereof, where $R'$ is a hydrocarbon radical of no more than twelve carbon atoms, $m$ is an integer of 0 through 1, R is selected from the group consisting of alkyl radicals of less than seven carbon atoms and alkoxyalkyl radicals of less than seven carbon atoms, and $x$ is an integer of 3 through 4; and (c) a catalytic amount of a curing catalyst.

3. The process of claim 1 where (c) is a peroxide curing catalyst.

4. The process of claim 2 where (c) is a peroxide curing catalyst.

5. The process of claim 1 where (b) is ethylpolysilicate.

6. The process of claim 2 where (b) is ethylpolysilicate.

7. A heat-curable elastomer composition consisting essentially of (a) a mixture of 100 parts by weight of a polyorganosiloxane in which the organic substituents are essentially all selected from the group consisting of methyl, phenyl, trifluoropropyl, hydrogen, hydroxyl, and vinyl radicals, no more than 0.5 mol percent of said substituents being hydrogen, hydroxyl and vinyl, said siloxane having a degree of polymerization of at least 100, plus from 2 to 35 parts by weight of fibrous chrysotile asbestos as a filler, (b) a stabilizing amount of a compound selected from the group consisting of $R'_m Si(OR)_x$ and partial hydrolyzates thereof, where $R'$ is a hydrocarbon radical of no more than twelve carbon atoms, $m$ is an integer of 0 through 1, R is selected from the group consisting of alkyl radicals of less than seven carbon atoms and alkoxyalkyl radicals of less than seven carbon atoms, and $x$ is an integer of 3 through 4; and (c) a catalytic amount of a curing catalyst.

8. A heat-curable elastomer composition consisting essentially of (a) a mixture of 100 parts by weight of a polyorganosiloxane in which the organic substituents are essentially all selected from the group consisting of methyl, phenyl, trifluoropropyl, hydrogen, hydroxyl, and vinyl radicals, no more than 0.5 mol percent of said substituents being hydrogen, hydroxyl and vinyl, said siloxane having a degree of polymerization of at least 100, plus from 2 to 35 parts by weight of fibrous chrysotile asbestos as a filler, (b) from 5 to 75 percent by weight, based on the weight of said chrysotile filler, of a compound selected from the group consisting of $R'_m Si(OR_x$ and partial hydrolyzates thereof, where $R'$ is a hydrocarbon radical of no more than twelve carbon atoms, $m$ is an integer of 0 through 1, R is selected from the group consisting of alkyl radicals of less than seven carbon atoms and alkoxyalkyl radicals of less than seven carbon atoms, and $x$ is an integer of 3 through 4; and (c) a catalytic amount of a curing catalyst.

9. The composition of claim 7 where (c) is a peroxide curing catalyst.

10. The composition of claim 8 where (c) is a peroxide curing catalyst.

11. The composition of claim 7 where (b) is ethylpolysilicate.

12. The composition of claim 8 where (b) is ethylpolysilicate.

13. The cured composition of claim 7.

14. The cured composition of claim 8.

References Cited

UNITED STATES PATENTS

| | | | |
|---|---|---|---|
| 2,610,167 | 9/1952 | Te Grotenhuis | 260—37 |
| 2,658,881 | 11/1953 | Hirsch | 260—37 |
| 2,999,077 | 9/1961 | Nitzsche | 260—37 |
| 3,179,619 | 4/1965 | Brown | 260—37 |
| 3,243,404 | 3/1966 | Martellock | 260—37 |
| 2,913,419 | 11/1959 | Alexander | 106—308 |
| 2,885,366 | 5/1959 | Iler | 106—308 |

MORRIS LIEBMAN, *Primary Examiner.*

R. BARON, *Assistant Examiner.*

U.S. Cl. X.R.

106—308; 260—47.5